A. J. McCAULEY.
CAR TRUCK.
APPLICATION FILED MAR. 28, 1912.

1,028,049.

Patented May 28, 1912.

Attest
C. H. Martens
Fannie E. Weber

Inventor:
Albert J. McCauley

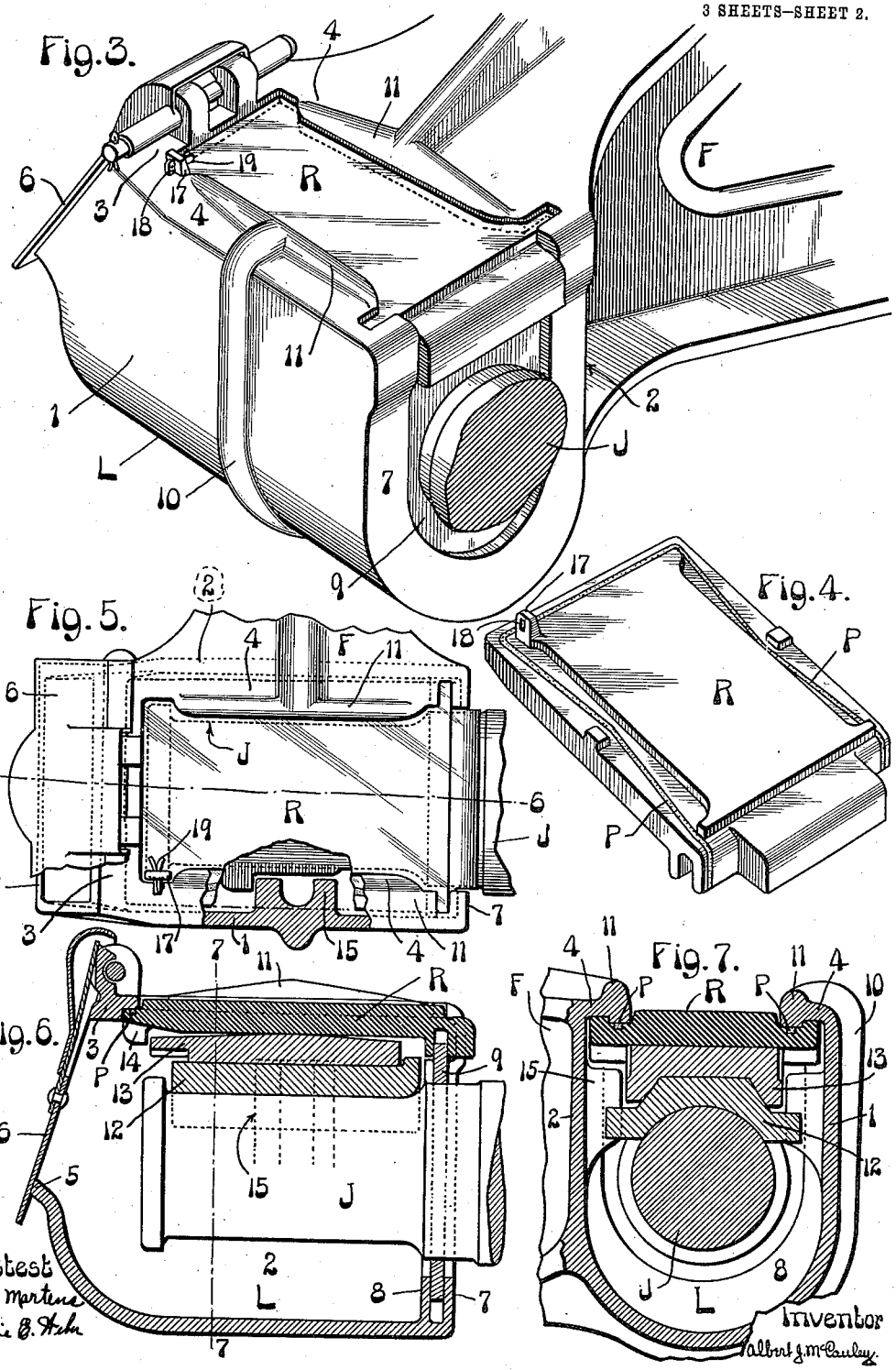

A. J. McCAULEY.
CAR TRUCK.
APPLICATION FILED MAR. 28, 1912.

1,028,049.

Patented May 28, 1912.
3 SHEETS—SHEET 3.

Attest
C. H. Martine
Fannie B. Weber

Inventor:
Albert J. McCauley

UNITED STATES PATENT OFFICE.

ALBERT J. McCAULEY, OF ST. LOUIS, MISSOURI.

CAR-TRUCK.

1,028,049.   Specification of Letters Patent.   Patented May 28, 1912.

Application filed March 28, 1912. Serial No. 686,860.

*To all whom it may concern:*

Be it known that I, ALBERT J. MCCAULEY, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, in which—

Figure 1 is a side elevation, partly in section, of a car truck embodying the features of this invention; Fig. 2 is a top or plan view of the truck shown in Fig. 1; Fig. 3 is a perspective view showing the end portion of a side frame; Fig. 4 is a perspective view of one of the removable sections which are applied to the side frames to close the journal receiving openings; Fig. 5 is a plan view, partly in section, of the parts shown in Fig. 3; Fig. 6 is a longitudinal sectional view taken approximately on the line 6—6 of Fig. 5; Fig. 7 is a sectional view taken approximately on the line 7—7, Fig. 6; and Fig. 8 to Fig. 12 inclusive are sectional views, illustrating modifications.

This invention relates to improvements in car trucks; the main object being to produce a car truck in which the wheels and axles can be easily removed from connected side frames.

To remove the wheels and axles from journal boxes formed integral with side frames, it is necessary to dismantle the truck by disconnecting the two side frames and then moving the side frames away from each other to separate the journals from the journal boxes. To avoid this labor various divided or separable journal boxes have been devised, such structure including journal box sections cast integral with the frame and removable journal box sections fastened onto the frame by means of bolts or similar fastening devices. It is quite difficult to produce and maintain a tight, dust proof joint between the separable edges of journal box sections that are merely connected by bolts or other similar fastening devices, because such fastening devices are liable to work loose when the truck is in service.

Therefore, one of the objects of this invention is to provide a journal box structure comprising separable sections which are forced into engagement with each other by the weight of the car body and truck frame, thereby producing and maintaining an absolutely tight joint at the separable edges of the sections.

Other objects and advantages as well as the novel details of construction will be hereinafter pointed out.

In the preferred form of my invention each side frame is a casting, open at the top to receive the journals, and removable sections which support the frame constitute the top walls of these openings. The side frames may be permanently connected together. To remove the wheels and axles, the side frames are raised to disengage the removable sections therefrom, and thereafter said sections are removed to allow the journals to pass out through the journal receiving openings.

In the accompanying drawings:—F designates side frames, preferably, but not essentially, of the diamond type. The side frames may be connected by a spring plank S and a bolster B or any other suitable connecting devices. Each side frame F is preferably a casting having lubricant receptacles L integrally connected to its ends, said lubricant receptacles being open at the top to receive journals J which extend from the wheels W.

Referring more particularly to Figs. 3 to 7 inclusive, it will be noted that each lubricant receptacle comprises side walls 1 and 2 integrally connected by a curved bottom wall and also integrally conected at the top by a bridge 3. The side walls have inturned top flanges 4. A complete door frame 5 is formed integral with the lubricant receptacle, and the usual door or lid 6 may be used with this door frame. Ribs 7 and 8 extending around the side and bottom walls of the lubricant receptacle provide grooves for the reception of a dust guard 9. As the side frame is open at the top it is preferably reinforced by one or more ribs 10 extending around the bottom and outer walls of the lubricant receptacle and it may also be strengthened by ribs 11 at the side edges of the opening. Each journal receiving opening extends from the inner face of the frame to a point near the outer edge thereof and said opening is normally closed by a removable section R. The bridge 3 and flanges 4 forming the side and front walls of the journal receiving opening are provided with closure seats which lie above and rest on the side and front margins of the removable section R. The usual "brass" or bearing 12 is seated on the journal J and the usual wedge 13 is interposed between said bearing and the removable section R. The removable section R constitutes a wedge seat and it is preferably provided with one or more wedge stops 14 (Fig. 6). The bearing stops 15 are integral with the side frame.

Fig. 1 and Fig. 7, show that the side frames are supported by the journals, the load being transmitted through the sections R, bearings 12 and wedges 13. As the weight of the side frames is transmitted to the journals through the removable sections R which span the journal receiving openings it will be understood that said frames are always firmly forced onto the members R so as to produce an absolutely tight joint around each journal receiving opening.

Each removable section R is interlocked with the bridge 3 as shown in Fig. 6, and also interlocked with the under side of the flanges 4 as seen in Fig. 7. It should be noted that the truck frame is held interlocked with the removable sections by the pressure of its own weight. As the removable sections are interlocked with the flanges 4 at the upper edges of the opposite side walls 1 and 2, said side walls are positively connected to each other by the removable sections.

If desired, the removable sections may be connected to the side frames by means of fastening devices, each of the sections I have shown being provided with an ear 17 having an opening 18 for the reception of a split key 19, one end of which is seated on a flange 4, see Figs. 3 to 5.

The removable sections R preferably overlap the dust guards 9 and may be provided with grooves to receive the upper ends of the dust guards (Fig. 6).

In removing the wheels and axles, the connected side frames are raised to allow the removable sections to be disengaged from the lubricant receptacles, and the bearings 12, wedges 13, and removable sections R may then be removed through the door frames 5. Thereafter, the side frames may be dropped to allow the journals to pass over the top faces of the lubricant receptacles.

As a high degree of accuracy can not be obtained in making the large side frame castings, packing P is preferably interposed between the removable sections R and the side frames (Figs. 4, 6 and 7). This packing is compressed around the journal receiving openings by the combined weight of the truck frame and car body. The packing P may be formed by strips of fiber, leather, waste, or any other suitable material, but it is preferably lead or some other soft metal which will yield in response to pressure and thereby form a seal between the removable sections and the side frames.

Figure 1:
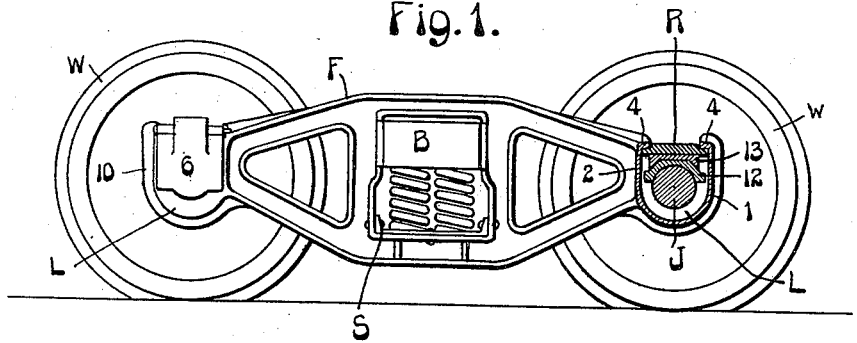
Figure 2:
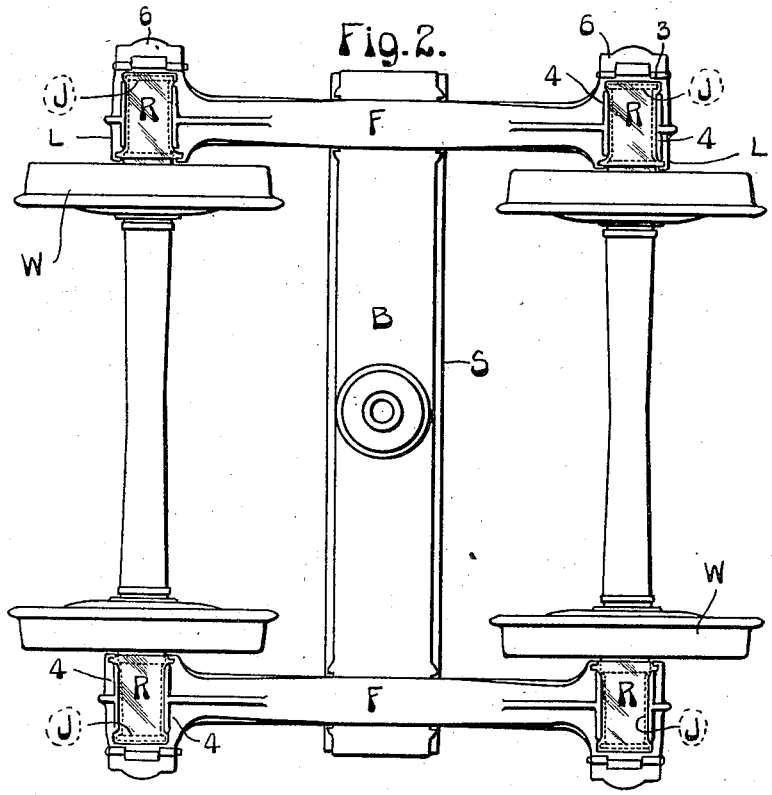
Figure 8:
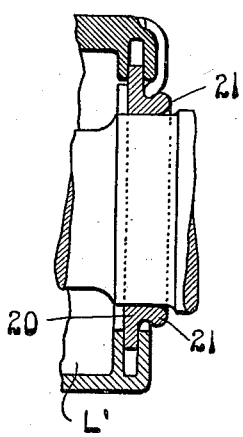
Fig. 8 illustrates a modification in which a metal dust guard 20, interlocked with the lubricant receptacle L' has a flange 21 which surrounds the journal and extends beyond the inner face of the lubricant receptacle.
Figure 9:
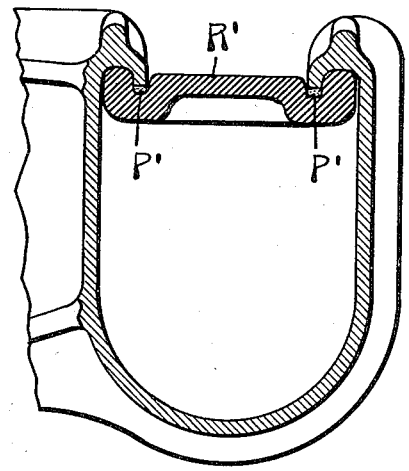
Fig. 9 shows a lubricant receptacle having its opposite side walls connected by a removable section R', said walls having downturned flanges which engage the packing P'.
Figure 10:
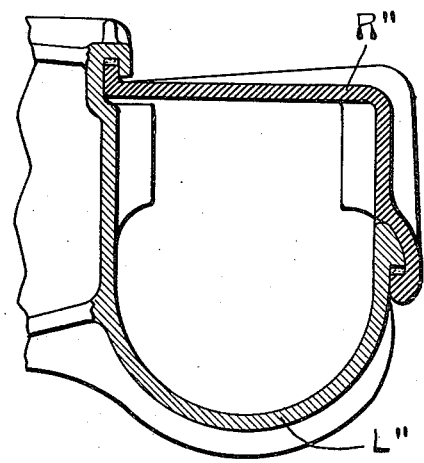
Fig. 10 illustrates a removable section R'' which forms the top wall and a portion of a side wall of the lubricant receptacle L''.
Figure 11:
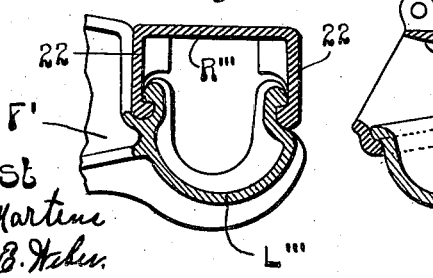
Fig. 11 and Fig. 12 illustrate a structure in which the removable section R''' has a pair of depending flanges 22 which are interlocked with the lubricant receptacle L''' so as to constitute hangers for the side frame F'.
Figure 12:
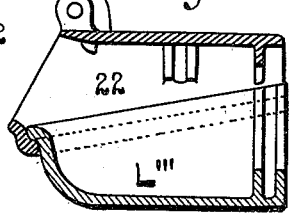

Having thus described the invention, what is claimed as new and desired to be secured by Letters Patent is:—

1. A car truck having a frame provided with journal receiving openings, and removable sections closing said journal receiving openings, said frame being supported by and seated on said removable sections so as to produce a tight joint around each of the journal receiving openings.

2. A car truck having a frame provided with journal receiving openings, removable sections closing said journal receiving openings, said frame being supported by and seated on said removable sections so as to produce a tight joint around each of the journal receiving openings, and packing interposed between said frame and removable sections.

3. A car truck having side frames, means for connecting said side frames, each side frame being provided with journal receiving openings which extend from the inner face of the frame to a point near the outer edge thereof, said openings allowing the journals to be removed from the connected side frames, and removable sections closing said journal receiving openings, said frames being supported by and seated on said removable sections so as to produce a tight joint around each of the journal receiving openings.

4. A car truck having side frames connected to each other, each side frame being provided with lubricant receptacles having journal receiving openings, said openings allowing the journals to be removed from the connected side frames, and removable sections closing said journal receiving openings, said frames being supported by and seated on said removable sections so as to produce a tight joint around each of the journal receiving openings.

5. A car truck having side frames connected to each other, lubricant receptacles integral with said side frames, said lubricant receptacles being open at the top to receive journals and to allow the journals to be removed from the connected frames, and removable sections closing said journal receiving openings and constituting supports for said connected frames.

6. A car truck having side frames of the diamond type, a spring plank connecting said side frames, each side frame being in the form of a casting having journal receiving openings in its top face, said openings allowing journals to be applied to or removed from the connected side frames, and removable closures for said journal receiving openings.

7. A car truck having a frame, lubricant receptacles formed integral with said frame and provided with journal receiving openings which allow journals to be removed from said frame, and removable sections closing said journal receiving openings, said lubricant receptacles being provided with seats which lie above and rest on portions of said removable sections.

8. A car truck having a frame, lubricant receptacles formed integral with said frame and provided with journal receiving openings, and removable sections supporting said frame and closing said journal receiving openings, said lubricant receptacles being provided with seats which lie above and rest on portions of said removable sections.

9. A car truck having a frame, lubricant receptacles integral with said frame, said lubricant receptacles having journal receiving openings extending from their inner faces to a point near their outer edges, said lubricant receptacles also having closure seats at the side and front edges of the journal receiving openings, closures spanning said journal receiving openings and constituting supports for said frame, said closures being provided with seats which lie below and coöperate with the seats on said lubricant receptacles.

10. A car truck having side frames connected to each other, lubricant receptacles integral with said side frames, said lubricant receptacles being open to allow journals to be applied to or removed from the connected side frames, and removable wedge seats constituting closures for said openings.

11. A car truck having side frames connected to each other, lubricant receptacles integral with said side frames, said lubricant receptacles being open to allow journals to be applied to or removed from the connected side frames, and removable wedge seats constituting closures for said openings, each of said removable members being provided with a wedge stop.

12. A car truck having side frames connected to each other, each side frame being composed of a casting open at the top to receive journals, said openings allowing journals to be removed from the connected side frames, and removable sections supporting said frames and constituting the top walls of said openings, said frames being provided with seats, which lie above and rest on portions of said removable sections.

13. A car truck having a frame composed of a casting open at the top to receive journals, and removable sections supporting said frame and constituting the top walls of said journal receiving openings, said frame being provided with seats which lie above and rest on portions of said removable sections.

14. A car truck having a frame provided with journal receiving openings, removable sections supporting said frame and constituting closures for said journal receiving openings, said frame being interlocking with said removable sections and held interlocked therewith by the pressure of its own weight.

15. A car truck having a frame provided with journal receiving openings, and removable sections closing said journal receiving openings, said frame being interlocked with, supported by and seated on said removable sections so as to produce a tight joint around the journal receiving openings and at the same time hold said parts interlocked with each other.

16. A car truck having side frames connected to each other, lubricant receptacles integral with said side frames, said lubricant receptacles being open at the top to allow journals to be applied to or removed from the connected side frames, and removable sections supporting said frames and constituting closures for said openings, said removable sections being interlocked with the opposing side walls of said openings so as to positively connect said side walls.

In testimony whereof, I hereunto affix my signature in the presence of two witnesses, this 26th day of March, 1912.

ALBERT J. McCAULEY.

Witnesses:
C. H. MARTENS,
FANNIE E. WEBER.

---

Copies of this patent may be obtained for five cents each, by addressing the "Commissioner of Patents, Washington, D. C."